April 13, 1954     R. A. ISBERG     2,675,476

OSCILLATOR

Filed June 23, 1945

INVENTOR.
REUBEN A. ISBERG

BY Ralph L Chappell

ATTORNEY

Patented Apr. 13, 1954

2,675,476

UNITED STATES PATENT OFFICE 2,675,476

OSCILLATOR

Reuben A. Isberg, Lynbrook, N. Y., assignor to the United States of America as represented by the Secretary of the Navy Application June 23, 1945, Serial No. 601,158

11 Claims. (Cl. 250—36)

The present invention relates to oscillators and more particularly to an oscillator yielding multiple frequencies each in a distinct output circuit.

In carrying out the invention, a push-pull oscillator of conventional design is provided with a common cathode circuit. Plate and cathode tank circuits are provided from which the output frequencies are taken.

An object of the present invention is to provide an improved and simplified oscillator for yielding multiple frequencies.

Another object of the invention is to provide a push-pull oscillator having tank circuits for yielding odd and even harmonics respectively.

These and other objects will be apparent from the following specification when taken with the accompanying drawings in which.

Figure 1:
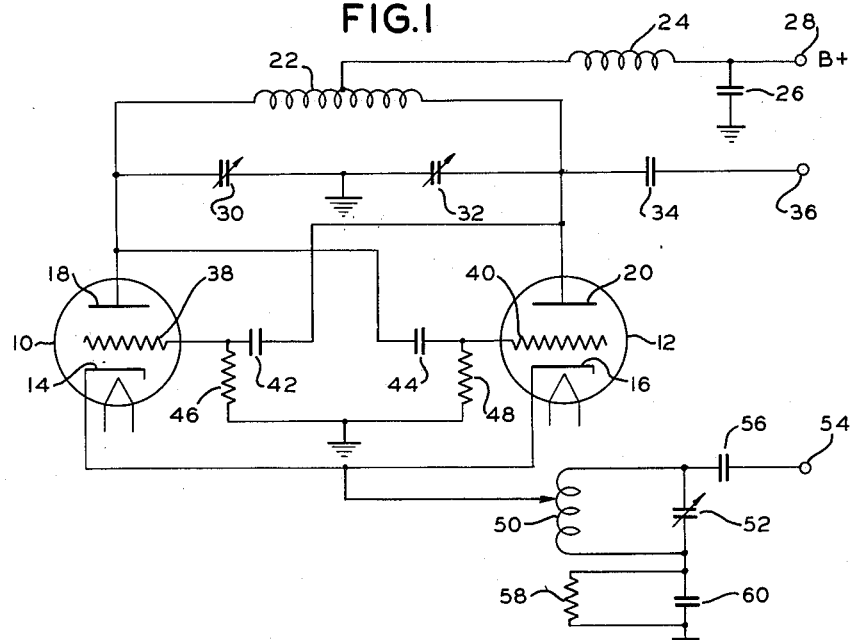
Fig. 1 is a wiring diagram of one form of the invention.

Triodes 10 and 12 have their cathodes 14 and 16 connected for a common return to ground. Plates 18 and 20 have a center-tapped coil 22 connected between them, the center tap being connected to a positive high-voltage source 28 through a R. F. choke 24 by-passed by capacitor 26. The coil 22 is tuned by capacitors 30 and 32 in series to form a plate tank, the junction of these capacitors being grounded. The plate tank is coupled by means of capacitor 34 to the fundamental frequency output terminal 36. Control grids 38 and 40 are cross-coupled through capacitors 42 and 44 to plates 18 and 20. Resistors 46 and 48 provide the main grid bias. So much of the circuit is considered a conventional push-pull oscillator.

In order to produce an additional frequency from this single-stage oscillator, a tank circuit consisting of coil 50 and capacitor 52 is provided with an adjustable coupling to the common return of the cathodes 12 and 14. As shown, the coil 50 is tapped for direct coupling, as a means of impedance matching. The output terminal 54 is coupled to this tank through capacitor 56. A resistor 58, by-passed by capacitor 60, provides protective grid bias for the tubes.

In the use of the invention as disclosed in Fig. 1, the plate tank circuit is tuned to the fundamental frequency of the oscillator, and the cathode return tank circuit is tuned to any even harmonic. The circuit according to the invention is particularly desirable in view of the fact that even harmonics are cancelled out of the plate circuit and odd harmonics are largely cancelled out of the common cathode return circuit. Thus, practically any desired even harmonic may be obtained from the output 54 of the common cathode return tank circuit by appropriately tuning that tank circuit, and this output is at a low D.-C. potential with respect to ground in the circuit shown. Alternatively the even harmonic tank might be in the common plate lead.

Figure 2:
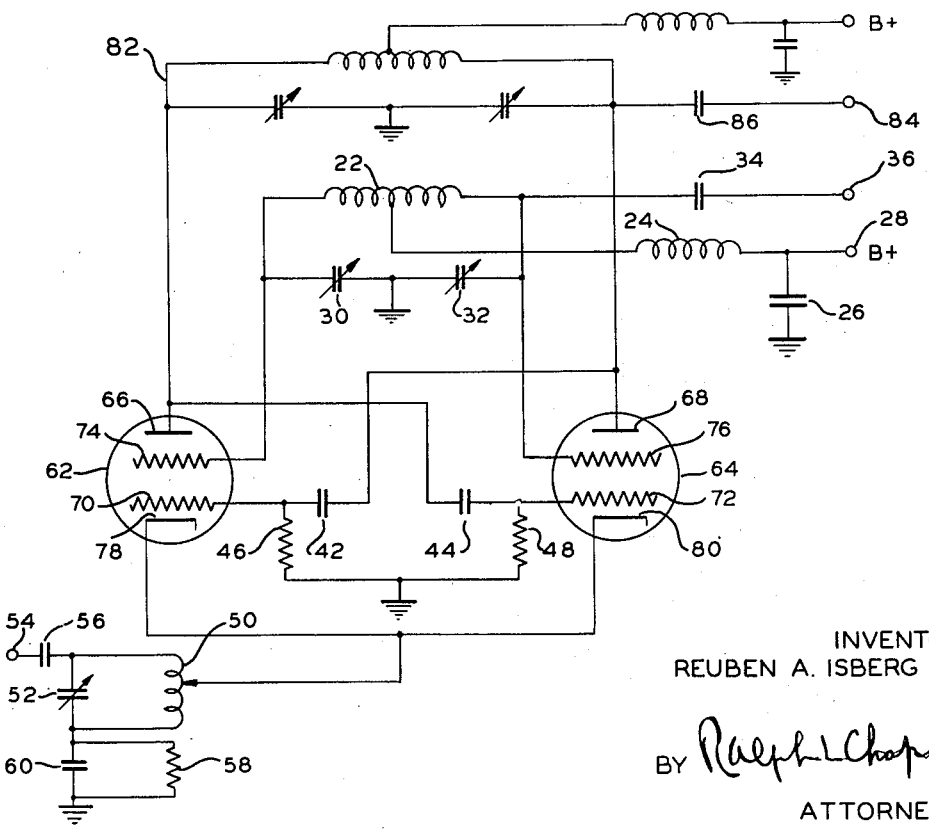
Fig. 2 is a wiring diagram of the second form of the invention.

Another form of the invention is disclosed in Fig. 2. In this form, triodes 10 and 12 of Fig. 1 have substituted therefor, tetrodes 62 and 64, respectively. These tubes are provided with plates 66 and 68, control grids 70 and 72, screen grids 74 and 76, and cathodes 78 and 80. The fundamental frequency tank circuit 22, 30, 32 is connected between the screen grids, while plates 66 and 68 are connected to the coil terminals of frequency multiplier tank circuit 82 tuned to an odd harmonic of the screen tank circuit. The screens and plates are suitably energized from the B supply, either from the same voltage point or different ones depending on the type of tubes used. Fundamental frequency output appears at terminal 36. Third or higher odd harmonic output may be obtained through coupling capacitor 86 at terminal 84.

The screen and cathode circuits function much as the plate and cathode circuits of Fig. 1, the plate circuit functioning additionally to provide an electron-coupled, odd harmonic, frequency multiplier in the single push-pull stage. Thus, there may be obtained simultaneously from the system any desired odd harmonic from the plate tank circuit and any desired even harmonic from the cathode return tank circuit, within practical limits, in addition to the fundamental frequency if all three are required.

Having thus described my invention, what I desire to secure by Letters Patent and claim is:

1. A multiple frequency oscillator comprising, a push-pull oscillator including a pair of electron tubes each having at least an anode, a control grid, and a cathode, a first tank circuit resonant to the fundamental frequency of said oscillator being serially connected between the anodes of said tubes, cross-coupling means connecting the control grid of each tube to the anode of the other tube, a second tank circuit resonant at an even harmonic of said fundamental frequency, and a common cathode circuit for said tubes being coupled to said second tank circuit.

2. A circuit comprising, a pair of electron tubes each having at least an anode, a control grid, and a cathode, means including a condenser cross-coupling the control grid of each tube to the anode of the other tube, a pair of resistors respectively connected between said control grids and a reference voltage point to provide bias therefor, a first tank circuit including the parallel arrangement of an inductance and a pair of capacitors in series, said parallel arrangement being serially connected between the anodes of said tubes and resonant to a first frequency, the junction of said capacitors being coupled to said reference voltage point, a second tank circuit comprising an inductance and a capacitor connected in parallel, said second tank circuit being resonant to an even harmonic of said first frequency, a common cathode circuit for said tubes being coupled to said second tank circuit, and biasing means including a resistor being serially connected with said common cathode circuit and said second tank circuit to said reference voltage point.

3. In a push-pull oscillator including two tubes each having an anode, a control grid, a screen grid and a cathode, said oscillator having a common cathode return circuit, a first tank circuit resonant to a fundamental frequency being serially connected between the screen grids of said tubes, a second tank circuit resonant to an odd harmonic of said fundamental frequency being serially connected between the anodes of said tubes, a third tank circuit resonant to an even harmonic of said fundamental frequency being connected in said common cathode return circuit, and means for tuning said tank circuits simultaneously to obtain different frequency outputs therefrom.

4. A circuit having a multiple frequency output comprising, a push-pull oscillator including a pair of electron tubes each having an anode, a cathode, a control grid and a screen grid, cross-coupling means including a condenser connecting the control grid of each tube to the anode of the other tube, a first tank circuit resonant to the fundamental frequency of said oscillator being serially connected between the screen grids of said tubes, a second tank circuit resonant to an odd harmonic of said fundamental frequency being serially connected between the anodes of said tubes, a third tank circuit resonant to an even harmonic of said fundamental frequency, a common cathode circuit for said tubes being variably coupled to said third tank circuit, and output circuits coupled to each of said tank circuits.

5. A circuit for simultaneously providing output potentials of odd and even harmonics of a fundamental frequency comprising, in combination with a push-pull oscillator including a pair of electron tubes each having an anode, a control grid, a screen grid and a cathode, a common cathode return circuit and cross-coupling means between each control grid and the anode of the opposite tube, a first resonant circuit including the parallel arrangement of an inductance with a first pair of capacitors in series, said parallel arrangement being connected between the screen grids of said tubes and resonant to a fundamental frequency, the junction of said first pair of capacitors being coupled to a reference voltage point, a second resonant circuit including the parallel arrangement of an inductance with a pair of capacitors in series connected between the anodes of said tubes and resonant to an odd harmonic of said fundamental frequency, and a third resonant circuit including an inductance and capacitor in parallel connected in said common cathode return circuit, said third resonant circuit being resonant to an even harmonic of said fundamental frequency, first, second, and third output circuits respectively coupled to said resonant circuits, and means for tuning said resonant circuits simultaneously to obtain different frequency outputs therefrom.

6. Apparatus comprising a push-pull oscillator including a pair of electron tubes each having at least an anode, a control grid and a cathode, a first oscillatory circuit tuned to a fundamental frequency and coupled between the anodes of said tubes and a second oscillatory circuit tuned to an even harmonic of said fundamental connected in the common cathode of said push-pull oscillator.

7. Apparatus comprising a push-pull oscillator including a pair of electron tubes each having at least an anode, a control grid and a cathode, a first oscillatory circuit tuned to a fundamental frequency and coupled between the anodes of said tubes, a second oscillatory circuit resonant at an even harmonic of said fundamental frequency, means connecting the cathodes of said tubes together and coupling them to said oscillatory circuit and biasing means including a resistor connected serially with said cathode and said second oscillatory circuit to ground.

8. Apparatus comprising a push-pull oscillator including a pair of electron tubes each having an anode, a screen grid, a control grid and a cathode, a first oscillatory circuit resonant at a fundamental frequency connected between the screen grids of said tubes, a second oscillatory circuit resonant at an odd harmonic of said fundamental coupled between the anodes of said electron tubes, a third oscillatory circuit resonant at an even harmonic of said fundamental, means connecting the cathodes of said tubes together and coupling them to said third oscillatory circuit and biasing means including a resistor connected serially with said cathodes and said third oscillatory circuit to ground.

9. Apparatus comprising a push-pull oscillator including a pair of electron tubes each having at least a cathode, a control grid and an electrode operated at a positive potential, a plurality of oscillatory circuits, one of said oscillatory circuits being tunable to a fundamental frequency and coupled between said positively operated electrodes of said tubes, another of said oscillatory circuits being tuned to an even harmonic of said fundamental, means connecting the cathodes of said tubes together to provide a common cathode circuit, said other oscillatory circuit being connected in said common cathode circuit of said push-pull oscillator.

10. A circuit having a multiple frequency output comprising, a push-pull oscillator including a pair of electron tubes each having a plurality of electrodes including a screen grid, anode and cathode, a plurality of tank circuits, means connecting the cathodes of said tubes together to provide a common cathode circuit, means connecting one of said plurality of tank circuits in said common cathode circuit, and means connecting the remainder of said plurality of tank circuits between said screen grids and between said anode electrodes of said electron tubes.

11. A circuit having a multiple frequency output comprising, a push-pull oscillator including a pair of electron tubes each having a cathode, a control grid and at least one positively operated electrode, a plurality of tank circuits one of which is tunable to a fundamental frequency and another of which is tunable to an even harmonic of said fundamental, means connecting said cathodes together to provide a common cathode circuit for said oscillator, means connecting said even harmonic tank circuit in said common cathode circuit, and means connecting said fundamental frequency tank circuit between corresponding positively operated electrodes of said tubes.

References Cited in the file of this patent

UNITED STATES PATENTS

| Number | Name | Date |
| --- | --- | --- |
| 1,754,749 | Gerth | Apr. 15, 1930 |
| 1,878,308 | Hansell | Sept. 20, 1932 |
| 1,914,120 | Hagen | June 13, 1933 |
| 1,973,303 | Appleton | Sept. 11, 1934 |
| 2,098,386 | Hansell | Nov. 9, 1937 |
| 2,106,821 | Tunick | Feb. 1, 1938 |
| 2,190,731 | Posthumus | Feb. 20, 1940 |
| 2,490,448 | Lott | Dec. 6, 1949 |
| 2,492,185 | Royden | Dec. 27, 1949 |